(12) United States Patent
Yazar et al.

(10) Patent No.: US 9,825,696 B2
(45) Date of Patent: Nov. 21, 2017

(54) ETHERNET LINK STATE SIGNALING FOR PACKET FLOWS MAPPED INTO OPTICAL TRANSPORT NETWORK WITH GENERIC FRAMING PROCEDURE

(71) Applicants: Onder Yazar, Ottawa (CA); Kyle Barr, Nepean (CA); Maha Beshara, Ottawa (CA)

(72) Inventors: Onder Yazar, Ottawa (CA); Kyle Barr, Nepean (CA); Maha Beshara, Ottawa (CA)

(73) Assignee: Ciena Corporation, Hanover, MD (US)

( * ) Notice: Subject to any disclaimer, the term of this patent is extended or adjusted under 35 U.S.C. 154(b) by 52 days.

(21) Appl. No.: 14/994,441

(22) Filed: Jan. 13, 2016

(65) Prior Publication Data
US 2017/0201318 A1 Jul. 13, 2017

(51) Int. Cl.
*G02F 1/00* (2006.01)
*H04B 10/03* (2013.01)

(52) U.S. Cl.
CPC .................................. *H04B 10/03* (2013.01)

(58) Field of Classification Search
CPC ............................................... H04B 10/03
USPC .................................................... 398/1
See application file for complete search history.

(56) References Cited

U.S. PATENT DOCUMENTS

| | | | |
|---|---|---|---|
| 8,787,147 B2 | 7/2014 | Caird et al. | |
| 8,982,775 B2 | 3/2015 | Rao et al. | |
| 2004/0114924 A1* | 6/2004 | Holness | H04J 3/14 398/33 |
| 2007/0195832 A1* | 8/2007 | Liu | H04J 3/1617 370/539 |
| 2009/0208208 A1* | 8/2009 | Chen | H04J 3/1658 398/45 |
| 2012/0170575 A1* | 7/2012 | Mehra | H04L 41/00 370/359 |

(Continued)

FOREIGN PATENT DOCUMENTS

| | | |
|---|---|---|
| EP | 2234293 A1 | 9/2010 |
| WO | 2010017838 A1 | 2/2010 |

OTHER PUBLICATIONS

International Telecommunication Union; ITU-T G.7041/Y.1303; Telecommunication Standardization Sector of ITU; Series G: Transmission Systems and Media, Digital Systems and Networks; Data over Transport; Generic aspects—General; Series Y: Global Information Infrastructure, Internet Protocol Aspects and Next-Generation Networks; Internet protocol aspects—Transport; Apr. 2011.

(Continued)

*Primary Examiner* — Juan A Torres
(74) *Attorney, Agent, or Firm* — Clements Bernard Walker PLLC; Christopher L. Bernard; Lawrence A. Baratta, Jr.

(57) ABSTRACT

Systems and methods of Ethernet link state signaling through a packet fabric with an Ethernet service transported over Optical Transport Network (OTN) utilizing Generic Framing Procedure Framed (GFP-F) mapping include demapping packets received from an OTN container over GFP-F; detecting a condition associated with the Ethernet service; and causing insertion of maintenance signals in OTN overhead based on the condition instead of using GFP-F Client Management Frames (CMF). The GFP-F mapping can be compliant to ITU-T Recommendation G.Sup43 (02/11) clause 6.2.

20 Claims, 5 Drawing Sheets

(56) References Cited

U.S. PATENT DOCUMENTS

| | | | | |
|---|---|---|---|---|
| 2013/0266312 A1* | 10/2013 | Prakash | ............... | H04B 10/07 |
| | | | | 398/33 |
| 2013/0322867 A1* | 12/2013 | Ibach | ................... | H04J 3/1652 |
| | | | | 398/2 |
| 2014/0334816 A1* | 11/2014 | Guo | ................... | H04Q 11/0003 |
| | | | | 398/45 |

OTHER PUBLICATIONS

International Telecommunication Union; ITU-T Series G; Telecommunication Standardization Sector of ITU; Supplement 43; Series G: Transmission Systems and Media, Digital Systems and Networks; Transport of IEEE 10GBASE-R in optical transport networks (OTN) ITU-T; Feb. 2011.

\* cited by examiner

ETHERNET LINK STATE SIGNALING FOR PACKET FLOWS MAPPED INTO OPTICAL TRANSPORT NETWORK WITH GENERIC FRAMING PROCEDURE

FIELD OF THE DISCLOSURE

The present disclosure generally relates to networking systems and methods. More particularly, the present disclosure relates to Ethernet link state signaling systems and methods for packet flows mapped into Optical channel Data Unit flex (ODUflex) and Optical channel Data Unit level j/i (ODUj/i) with Generic Framing Procedure Frame (GFP-F).

BACKGROUND OF THE DISCLOSURE

ODUj/k or ODUflex can be used to transport or switch Ethernet flows over Optical Transport Network (OTN) as defined in ITU-T Recommendation G.7041/Y.1303 (04/11) "Generic Framing Procedure" and ITU-T Recommendation G.Sup43 (02/11) "Transport of IEEE 10 GBASE-R in optical transport networks (OTN)," the contents of each is incorporated by reference. G.Sup43 defines several techniques to map and carry client traffic in clauses 6.2 "GFP-F mapping of 10 GBASE-R (LAN PHY) payload only into OPU2," 7.1 "Bit transparent mapping of 10 GBASE-R signal into OPU2e," and 7.2 "Bit transparent mapping of 10 GBASE-R signal into OPU1e." GSup43 clause 6.2 is the only available technique to carry Ethernet packet traffic inside an ODUflex container. ODUFlex is an efficient method of carrying packet flows which do not fully utilize the constant Ethernet bit rates such as 10 G, 40 G, 100 G, etc. These packet flows do not have a constant bit rate, and the ODUflex can be sized appropriately. Also, there are mechanisms to resize hitlessly ODUflex containers. ODUflex advantageously allows efficient transport of Ethernet traffic over OTN. In the G.Sup43 clause 6.2 mapping mode, the GFP payload includes Ethernet Media Access Control (MAC) frames, and framing and signaling are handled by the GFP protocol, such as through Client Management Frames (CMF).

GFP CMF frames are used for Ethernet framing and signaling. In the case of a failure, the CMF frames are sent periodically, at a minimum of 100 ms interval, to a far end. The far end can use the CMF frames to detect an alarm condition and take appropriate action. However, due to the defined interval for CMF frames, overall detection and backward signaling between a near end and the far end may accumulate long delays before ports are declared operationally down, e.g., in excess of 300 ms. This leads to poor traffic protection performance and loss of data.

BRIEF SUMMARY OF THE DISCLOSURE

In an exemplary embodiment, a method of Ethernet link state signaling through a packet fabric with an Ethernet service transported over Optical Transport Network (OTN) utilizing Generic Framing Procedure Framed (GFP-F) mapping includes demapping packets received from an OTN container over GFP-F; detecting a condition associated with the Ethernet service; and causing insertion of maintenance signals in OTN overhead based on the condition instead of using GFP-F Client Management Frames (CMF). The GFP-F mapping can be compliant to ITU-T Recommendation G.Sup43 (02/11) clause 6.2. The OTN container can include an Optical channel Data Unit flex (ODUflex). The OTN container can include one of a High Order Optical channel Data Unit j (HO ODUj) and a Low Order Optical channel Data Unit i (LO ODUi). The condition can be a fault and the maintenance signals in the OTN overhead can include one or more of a Lock (LCK) and a Backward Defect Indication (BDI). The maintenance signals can include one or more of an Optical channel Data Unit Open Connection Indication (ODU-OCI) and Optical channel Data Unit Alarm Indication Signal (ODU-AIS). The maintenance signals can include a Tandem Connection Monitor (TCM) provisioned for the Ethernet service between a head end node and a tail end node. The Ethernet service can be part of a Link Aggregation Group (LAG). The maintenance signals can signal one or of a local fault at the packet fabric and a remote fault at another packet fabric.

In another exemplary embodiment, a packet fabric adapted for Ethernet link state signaling with an Ethernet service transported over Optical Transport Network (OTN) utilizing Generic Framing Procedure Framed (GFP-F) mapping includes circuitry adapted to demap packets received from an OTN container over GFP-F; circuitry adapted to detect a condition associated with the Ethernet service; and circuitry adapted to cause insertion of maintenance signals in OTN overhead based on the condition instead of using GFP-F Client Management Frames (CMF). The GFP-F mapping can be compliant to ITU-T Recommendation G.Sup43 (02/11) clause 6.2. The OTN container can include an Optical channel Data Unit flex (ODUflex). The OTN container can include one of a High Order Optical channel Data Unit j (HO ODUj) and a Low Order Optical channel Data Unit i (LO ODUi). The condition can be a fault and the maintenance signals in the OTN overhead can include one or more of a Lock (LCK) and a Backward Defect Indication (BDI). The maintenance signals can include one or more of an Optical channel Data Unit Open Connection Indication (ODU-OCI) and Optical channel Data Unit Alarm Indication Signal (ODU-AIS). The maintenance signals can include a Tandem Connection Monitor (TCM) provisioned for the Ethernet service between a head end node and a tail end node. The Ethernet service can be part of a Link Aggregation Group (LAG). The maintenance signals can signal one or of a local fault at the packet fabric and a remote fault at another packet fabric.

In a further exemplary embodiment, a network adapted for Ethernet link state signaling with an Ethernet service transported over Optical Transport Network (OTN) utilizing Generic Framing Procedure Framed (GFP-F) mapping includes a head end node; a tail end node; and an OTN cloud communicatively coupling the head end node and the tail end node; wherein the head end node is adapted to map packets to an OTN container over GFP-F and the tail end node is adapted to demap the packets from the OTN container, and wherein the head end node and the tail end node are each adapted to cause insertion of maintenance signals in OTN overhead based on detection of a condition instead of using GFP-F Client Management Frames (CMF). The GFP-F mapping can be compliant to ITU-T Recommendation G.Sup43 (02/11) clause 6.2.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to Ethernet link state signaling systems and methods for packet flows mapped into Optical channel Data Unit flex (ODUflex) and Optical channel Data Unit level j/k (ODUj/k) with Generic Framing Procedure Framed (GFP-F). The systems and methods provide a link state forwarding mechanism for use in G.Sup43 clause 6.2 mapping "GFP-F mapping of 10 GBASE-R (LAN PHY) payload only into OPU2" (hereinafter referred to as GFP-F mapping). The link state forwarding mechanism is used in lieu of the GFP CMF frames as these frames introduce extra delays in detection and backward indication injection as described herein. The link state forwarding mechanism generally includes the same signaling information previously provided in the CMF frames into OTN overhead. Additionally, the systems and methods enable signaling of a port administrative state to a far end logical port. Since the link state forwarding mechanism utilizes Optical channel Data Unit (ODU)/Tandem Connection Monitoring (TCM) layer signaling, signaling can be performed immediately after fault detection and the detection delay is limited only based on a small link state forwarding software latency and a propagation delay of the ODU/TCM layer signaling. This results in orders of magnitude faster signaling, namely a few milliseconds with the link state forwarding mechanism versus hundreds of milliseconds with GFP CMF frame signaling.

The systems and methods can address protection in packet switching systems which have no inherent capability with PCS framing to carrying signaling over client signals in-band through a fabric. The systems and methods also address situations where when a logical packet port is administratively disabled; there is no native technique to signal the port status to the far end. Again, GFP-F signaling is too slow and unreliable.

Figure 1:
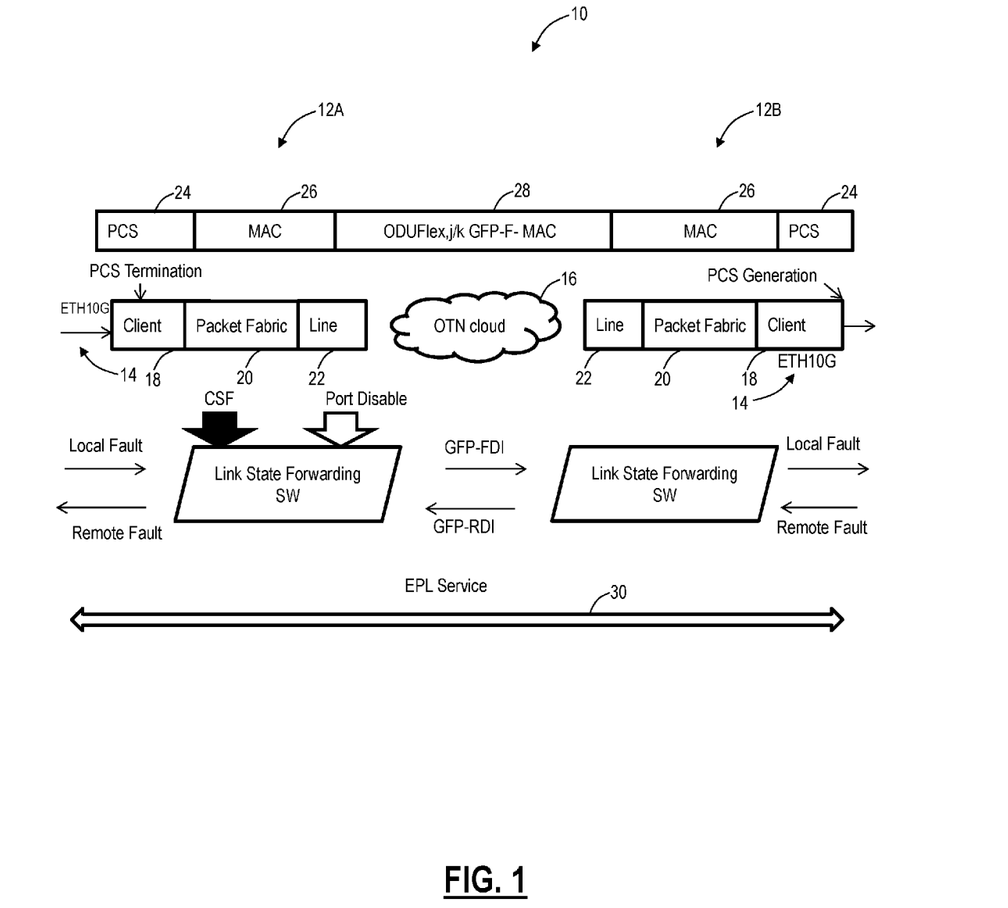
FIG. 1 is a logical block diagram of functionality in a network with two nodes communicating Ethernet over an OTN cloud using a GFP CMF frames.

Referring to FIG. 1, in an exemplary embodiment, a logical block diagram illustrates functionality in a network 10 with two nodes 12A, 12B communicating Ethernet 14 over an OTN cloud 16 using a GFP CMF frames. The nodes 12A, 12B include client circuitry 18, a packet fabric 20, and line circuitry 22. The client circuitry 18 is adapted to receive the Ethernet 14, such as 10 GbE through various Physical Media Dependent (PMDs) devices. The client circuitry 18 provides Physical Coding Sublayer (PCS) termination of a PCS layer 24 on an ingress port at the node 12A and PCS generation on an egress port at the node 12B. The packet fabric 20 includes circuitry adapted to switch and forward Ethernet flows at a MAC layer 26. The line circuitry 22 is adapted to map Ethernet flows at the MAC layer 26 to an ODUflex/i/j GFP-F MAC layer 28 for transmission over the OTN cloud 16. Note, the line circuitry 22 can also include optical components such as transceivers or modems for optical transmission between the nodes 12A, 12B via the OTN cloud 16. Collectively, the various components can support an Ethernet Private Line (EPL) service 30 between the nodes 12A, 12B.

The PCS layer 24 is a networking protocol sublayer in the Fast Ethernet, gigabit Ethernet, and 10/40/100 Gigabit Ethernet standards. The PCS layer 24 resides at the top of the physical layer (PHY) and provides an interface between the Physical Medium Attachment (PMA) sublayer and the Media Independent Interface (MII). The PCS layer 24 is responsible for data encoding/decoding, scrambling/descrambling, alignment marker insertion/removal, block and symbol redistribution, and lane block synchronization and deskew. The MAC layer 26 provides addressing and channel access control mechanisms that make it possible for several terminals or network nodes to communicate within a multiple access network that incorporates a shared medium, e.g., an Ethernet network. The MAC layer 26 acts as an interface between the logical link control (LLC) sublayer and the network's physical layer. The MAC layer 26 emulates a full-duplex logical communication channel in a multi-point network. This channel may provide unicast, multicast or broadcast communication service.

As described herein, the OTN cloud 16 includes the ODUflex/i/j GFP-F MAC layer 28 which denotes one of an Optical channel Data Unit flex (ODUflex), a Low Order (LO) Optical channel Data Unit i (ODUi), or a High Order (HO) Optical channel Data Unit j (ODUj) carrying the Ethernet 14 through GFP-F mapping, such as according to G.Sup43 clause 6.2 mapping "GFP-F mapping of 10GBASE-R (LAN PHY) payload only into OPU2." That is, the Ethernet 14 is GFP-F mapped and could be transported in the OTN cloud 16 via a dedicated, variable sized ODUflex, a LO ODUi, or a HO ODUj. Note, ODUflex provides an efficient container for the Ethernet 14 over the OTN cloud 16.

Again, in the various exemplary embodiments described herein, the GFP-F mapping is based on GFP-F G.Sup43 clause 6.2 mapping "GFP-F mapping of 10 GBASE-R (LAN PHY) payload only into OPU2" (again referred to as GFP-F mapping). On packet switching systems if the transport technique on the OTN facing line side is GFP-F GSup 43 6.2 over ODUj/k/ODUFlex, the Ethernet PCS layer 24 may never exist on the egress port, i.e., at the node 12B. At the node 12B, MAC frames received from the packet fabric 20 are directly mapped into GFP frames. Again, in this case, the framing and signaling functions are directly handled by the GFP protocol.

Note that, since framing and signaling functions are handed over to (or directly handled by) GFP, the general practice is to replace/signal the link state/administrative status and Client Signal Fail (CSF) signals with corresponding GFP Client Management Frames Forward Defect Indication/Reverse Defect Indication/Defect Clear Indication (FDI/RDI/DCI). CMF is a special GFP frame sent periodically (typically one frame every 100 ms). CFM frames do not immediately replace the actual link status and do not have enough density to sustain reliably the actual Ethernet link status over the ODU layer signal replacement (such as removal of an existing ODU layer maintenance signal). On the receiving end, a receiver may need to receive multiple CMF frames before it translates into an alarm (link Fault status) and downstream Ethernet conditioning.

Again, this causes delays in the end-to-end signaling of the link status on Ethernet Private Lines, such as the EPL service 30. This can lead to long protection switch times at the far end node 12B when the EPL service 30 belongs to a Link Aggregation Group (LAG) or the EPL service 30 uses multiple ODUflex paths as a protected/load sharing LAG group. Also, traffic leaking for short periods of time on that are not part of a LAG active link can occur during actual ODU layer maintenance signal replacement. This also translates into a loss of traffic where no actual protection is taking place.

Figure 2:
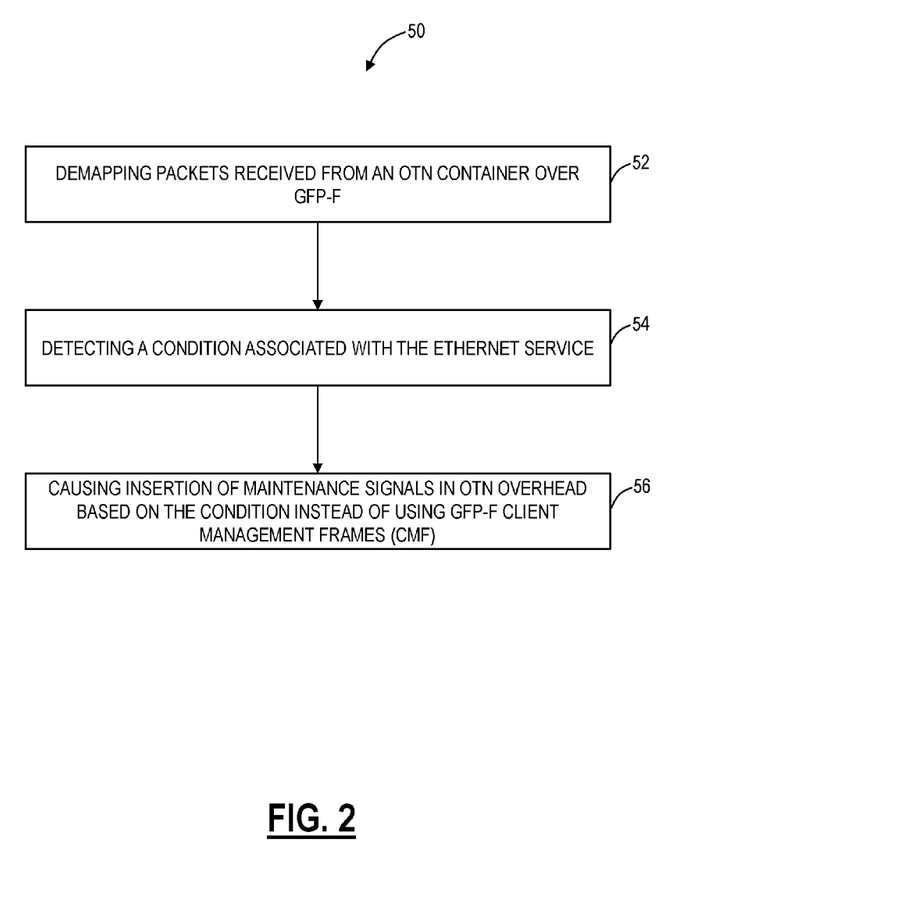
FIG. 2 is a flowchart of a process of Ethernet link state signaling through a packet fabric with an Ethernet service transported over Optical Transport Network (OTN) utilizing Generic Framing Procedure Framed (GFP-F) mapping.

Referring to FIG. 2, in an exemplary embodiment, a flowchart illustrates a process 50 of Ethernet link state signaling through a packet fabric with an Ethernet service transported over Optical Transport Network (OTN) utilizing Generic Framing Procedure Framed (GFP-F) mapping. The process 50 can be implemented via the packet fabric 20. In an exemplary embodiment, to address this problem observed in the packet fabric 20, Ethernet layer failures can be generated with an immediate ODU layer Lock (LCK) and Backward Defect Indication (BDI) signal in OTN overhead. Advantageously, OTN overhead is continuous and immediate (only limited by propagation delay) leading to continuous and immediate maintenance signals. This alleviates the consequent action delays and unexpected traffic loss.

The process 50 includes demapping packets received from an OTN container over GFP-F (step 52); detecting a condition associated with the Ethernet service (step 54); and causing insertion of maintenance signals in OTN overhead based on the condition instead of using GFP-F Client Management Frames (CMF) (step 56). The maintenance signal is based on a user choice of link state forwarding (GFP-CMF, ODU-LCK, ODU-OCI, ODU-AIS, TCM). The user can also provision the TCM level that will be automatically set up that will be devised to carry Link State Signaling.

The GFP-F mapping can be compliant to ITU-T Recommendation G.Sup43 (02/11) clause 6.2. The OTN container can include an Optical channel Data Unit flex (ODUflex). The OTN container can also include one of a High Order Optical channel Data Unit j (HO ODUj) and a Low Order Optical channel Data Unit i (LO ODUi). The condition can be a fault, and the maintenance signals in the OTN overhead can include one or more of a Lock (LCK) and a Backward Defect Indication (BDI). The maintenance signals can also include one or more of an Optical channel Data Unit Open Connection Indication (ODU-OCI) and Optical channel Data Unit Alarm Indication Signal (ODU-AIS).

The maintenance signals can include a Tandem Connection Monitor (TCM) provisioned for the Ethernet service between a head end node and a tail end node. A provisioned TCM can avoid ODU layer signaling and unwanted alarms on intermediate ODU switching/regenerating network elements. Specifically, the TCM is capable of carrying LCK, AIS, and/or OCI signals between provisioned points and will alleviate undesired alarm behavior on intermediate nodes in the OTN cloud 16 monitoring the ODU layer. Another possible approach includes using ODU layer protection overhead bytes to signal the link status of the contained packet flow when protection bytes are not terminated/monitored by any intermediate OTN system. The Ethernet service can be part of a Link Aggregation Group (LAG). The maintenance signals can signal one of a local fault at the packet fabric and a remote fault at another packet fabric.

In another exemplary embodiment, the packet fabric 20 is adapted for Ethernet link state signaling with an Ethernet service transported over Optical Transport Network (OTN) utilizing Generic Framing Procedure Framed (GFP-F) mapping. The packet fabric 20 includes circuitry adapted to demap packets received from an OTN container over GFP-F; circuitry adapted to detect a condition associated with the Ethernet service; and circuitry adapted to cause insertion of maintenance signals in OTN overhead based on the condition instead of using GFP-F Client Management Frames (CMF).

In a further exemplary embodiment, the network 10 is adapted for Ethernet link state signaling with an Ethernet service transported over Optical Transport Network (OTN) utilizing Generic Framing Procedure Framed (GFP-F) mapping. The network 10 includes a head end node 12A; a tail end node 12B; and an OTN cloud 16 communicatively coupling the head end node and the tail end node. The head end node 12A is adapted to map packets to an OTN container over GFP-F and the tail end node 12B is adapted to demap the packets from the OTN container, and the head end node 12A and the tail end node 12B are each adapted to cause insertion of maintenance signals in OTN overhead based on detection of a condition instead of using GFP-F Client Management Frames (CMF). The GFP-F mapping can be compliant to ITU-T Recommendation G.Sup43 (02/11) clause 6.2.

Figure 3:
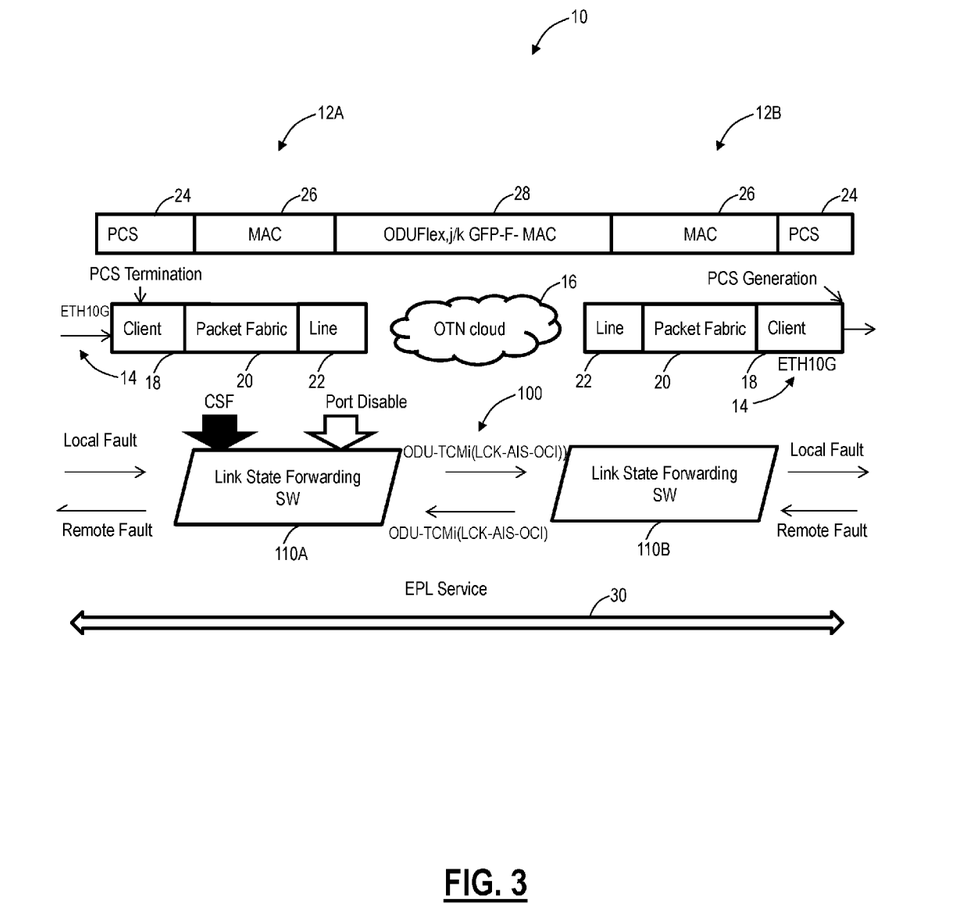
FIG. 3 is a logical block diagram of functionality in the network with two nodes communicating Ethernet over an OTN cloud using OTN overhead instead of GFP CMF frames.

Referring to FIG. 3, in an exemplary embodiment, a logical block diagram illustrates functionality in the network 10 with two nodes 12A, 12B communicating Ethernet 14 over an OTN cloud 16 using OTN overhead 100 instead of GFP CMF frames. In this example, the EPL service 30 is configured between the nodes 12A, 12B. Each of the nodes 12A, 12B include link state forwarding software 110A and 110B that is configured to monitor the EPL service 30, cause insertion of maintenance signaling in the OTN overhead 100, and detect maintenance signaling from the OTN overhead 100. The link state forwarding software 110A and 110B operates at the nodes 12A, 12B, such as on a controller, on the packet fabric 20, or a combination thereof. In this example, the node 12A provides ingress for the EPL service 30, and the node 12B provides egress. At the node 12A, the link state forwarding software 110A is adapted to detect a local fault on the Ethernet 14 as well as propagate a remote fault backward accordingly. This can include detection of CSF and disabling the port.

Upon detection of a local fault, the link state forwarding software 110A at the node 12A can cause a LCK, AIS, and/or OCI maintenance signal in the OTN overhead 100, such as at ODU-TCMi (where i=1 to 6). The link state forwarding software 110B at the node 12B is adapted to detect a local fault, to extract the LCK, AIS, and/or OCI maintenance signal in the OTN overhead 100, and to propagate the remote fault backward via the OTN overhead 100.

Figure 4:
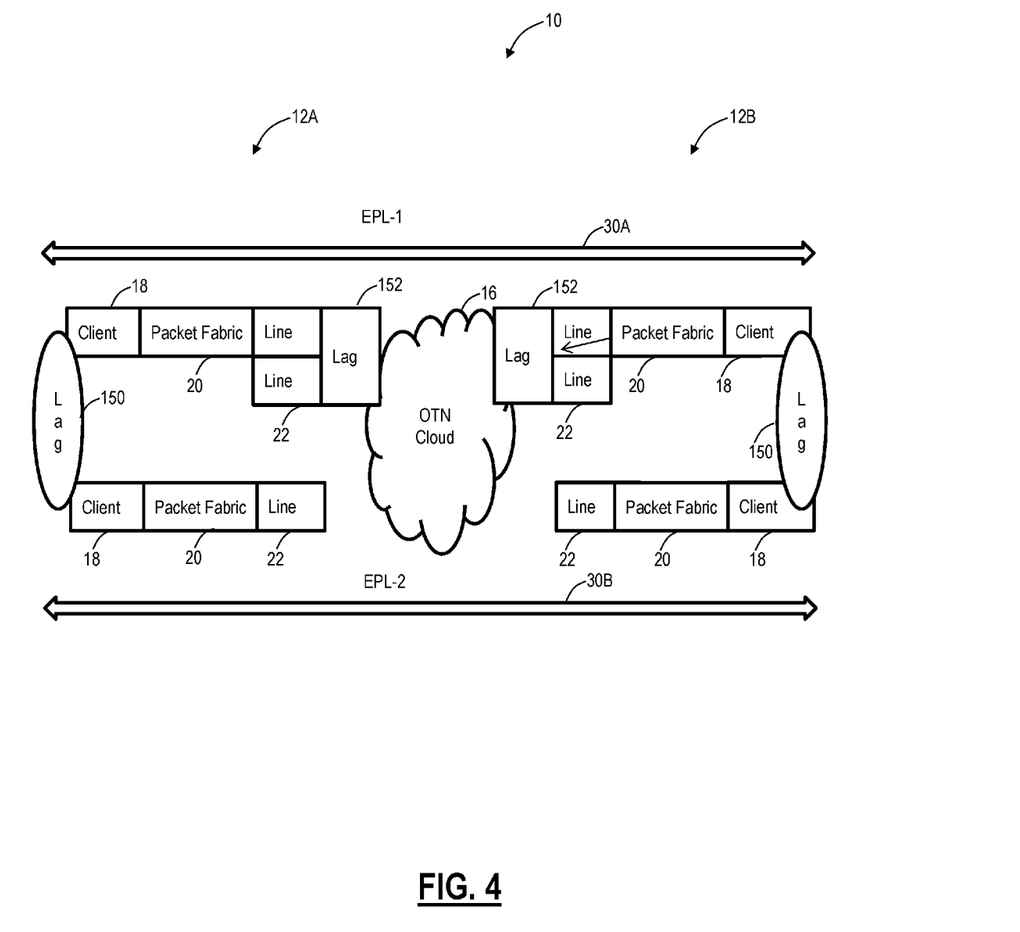
FIG. 4 is a logical block diagram illustrates functionality in the network with two nodes communicating EPL services over an OTN cloud using a Link Aggregation Group (LAG)

Referring to FIG. 4, in an exemplary embodiment, a logical block diagram illustrates functionality in the network 10 with two nodes 12A, 12B communicating EPL services 30A, 30B over an OTN cloud 16 using a Link Aggregation Group (LAG). Here, there are two EPL services 30A, 30B in a LAG 150, each can have its own client circuitry 18, packet fabric 20, and line circuitry 22. Also, the EPL service 30A can be in its own LAG 152 split between the line circuitry 22. Specifically, the LAG 150 is split between client circuitry 18, and the LAG 152 is split between line circuitry 22. Each of the LAGs 150, 152 can support immediate signaling via the OTN overhead 100.

Figure 5:
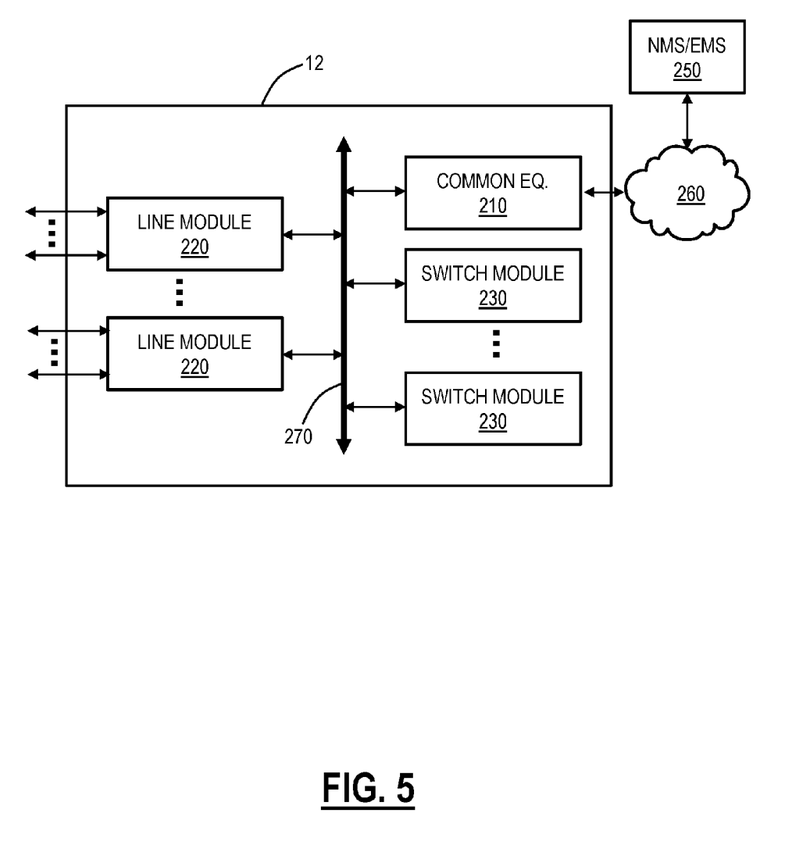
FIG. 5 is a block diagram of an exemplary node for use with the systems and methods described herein, specifically the nodes in the networks of FIGS. 1, 3, and 4.

Referring to FIG. 5, in an exemplary embodiment, a block diagram illustrates an exemplary node 12 for use with the systems and methods described herein, specifically the nodes 12A, 12B. In an exemplary embodiment, the exemplary node 12 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, etc. into a single, high-capacity intelligent switching system providing Layer 0, 1, and/or 2 consolidation, namely a Packet-Optical Transport System (POTS). In another exemplary embodiment, the node 12 can be any of an OTN Add/Drop Multiplexer (ADM), a Multi-Service Provisioning Platform (MSPP), a Digital Cross-Connect (DCS), an optical cross-connect, an optical switch, a router, a switch, a Wavelength Division Multiplexing (WDM) terminal, an access/aggregation device, etc. That is, the node 12 can be any digital system with ingress and egress digital signals and switching of channels, timeslots, tributary units, etc. While the node 12 is generally shown as an optical network element, the systems and methods contemplated for use with any switching fabric, network element, or network based thereon.

In an exemplary embodiment, the node 12 includes common equipment 210, one or more line modules 220, and one or more switch modules 230. The common equipment 210 can include power; a control module; operations, administration, maintenance, and provisioning (OAM&P) access; user interface ports; and the like. The common equipment 210 can connect to a management system 250 through a data communication network 260 (as well as a Path Computation Element (PCE), Software Defined Network (SDN) controller, OpenFlow controller, etc.). The management system 250 can include a network management system (NMS), element management system (EMS), or the like. Additionally, the common equipment 210 can include a control plane processor, such as a controller. The node 12 can include an interface 270 for communicatively coupling the common equipment 210, the line modules 220, and the switch modules 230 to one another. For example, the interface 270 can be a backplane, midplane, a bus, optical or electrical connectors, or the like. The line modules 220 are configured to provide ingress and egress to the switch modules 230 and to external connections on the links to/from the node 12. In an exemplary embodiment, the line modules 220 can form ingress and egress switches with the switch modules 230 as center stage switches for a three-stage switch, e.g. a three-stage Clos switch. Other configurations and/or architectures are also contemplated. The line modules 220 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, Flexible Ethernet, etc.

Further, the line modules 220 can include a plurality of optical connections per module and each module may include a flexible rate support for any type of connection, such as, for example, 155 MB/s, 622 MB/s, 1 GB/s, 2.5 GB/s, 10 GB/s, 40 GB/s, and 100 GB/s, N×1.25 GB/s, and any rate in between as well as future higher rates. The line modules 220 can include wavelength division multiplexing interfaces, short reach interfaces, and the like, and can connect to other line modules 220 on remote network elements, end clients, edge routers, and the like, e.g. forming connections on the links in the network 10. From a logical perspective, the line modules 220 provide ingress and egress ports to the node 12, and each line module 220 can include one or more physical ports. The switch modules 230 are configured to switch channels, timeslots, tributary units, packets, etc. between the line modules 220. For example, the switch modules 230 can provide wavelength granularity (Layer 0 switching); OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; and the like. Specifically, the switch modules 230 can include Time Division Multiplexed (TDM) (i.e., circuit switching) and/or packet switching engines. The switch modules 230 can include redundancy as well, such as 1:1, 1:N, etc. In an exemplary embodiment, the switch modules 230 provide OTN switching and/or Ethernet switching.

Those of ordinary skill in the art will recognize the node 12 can include other components which are omitted for illustration purposes, and that the systems and methods described herein are contemplated for use with a plurality of different network elements with the node 12 presented as an exemplary type of network element. For example, in another exemplary embodiment, the node 12 may not include the switch modules 230, but rather have the corresponding functionality in the line modules 220 (or some equivalent) in a distributed fashion. For the node 12, other architectures providing ingress, egress, and switching are also contemplated for the systems and methods described herein. In general, the systems and methods described herein contemplate use with any network element providing switching of channels, timeslots, tributary units, wavelengths, etc. and using a control plane or the like. Furthermore, the node 12 is merely presented as one exemplary node 12 for the systems and methods described herein.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of Ethernet link state signaling through a packet fabric with an Ethernet service transported over Optical Transport Network (OTN) utilizing Generic Framing Procedure Framed (GFP-F) mapping, the method comprising:
    demapping packets received from an OTN container over GFP-F;
    detecting a condition associated with the Ethernet service; and
    causing insertion of maintenance signals in OTN overhead based on the condition instead of using GFP-F Client Management Frames (CMF), wherein a receiving node detects the condition associated with the Ethernet service based on detection of the maintenance signals in the OTN overhead and performs associated actions on the Ethernet service.

2. The method of claim 1, wherein the GFP-F mapping is compliant to ITU-T Recommendation G.Sup43 (02/11) clause 6.2.

3. The method of claim 1, wherein the OTN container comprises an Optical channel Data Unit flex (ODUflex).

4. The method of claim 1, wherein the OTN container comprises one of a High Order Optical channel Data Unit j (HO ODUj) and a Low Order Optical channel Data Unit i (LO ODUi).

5. The method of claim 1, wherein the condition is a fault and the maintenance signals in the OTN overhead comprise one or more of a Lock (LCK) and a Backward Defect Indication (BDI).

6. The method of claim 1, wherein the maintenance signals comprise one or more of an Optical channel Data Unit Open Connection Indication (ODU-OCI) and Optical channel Data Unit Alarm Indication Signal (ODU-AIS).

7. The method of claim 1, wherein the maintenance signals comprise a Tandem Connection Monitor (TCM) provisioned for the Ethernet service between a head end node and a tail end node.

8. The method of claim 1, wherein the Ethernet service is part of a Link Aggregation Group (LAG).

9. The method of claim 1, wherein the maintenance signals signal one or of a local fault at the packet fabric and a remote fault at another packet fabric.

10. A packet fabric adapted for Ethernet link state signaling with an Ethernet service transported over Optical Transport Network (OTN) utilizing Generic Framing Procedure Framed (GFP-F) mapping, the packet fabric comprising:
    circuitry adapted to demap packets received from an OTN container over GFP-F;
    circuitry adapted to detect a condition associated with the Ethernet service; and
    circuitry adapted to cause insertion of maintenance signals in OTN overhead based on the condition instead of using GFP-F Client Management Frames (CMF), wherein a receiving node detects the condition associated with the Ethernet service based on detection of the maintenance signals in the OTN overhead and performs associated actions on the Ethernet service.

11. The packet fabric of claim 10, wherein the GFP-F mapping is compliant to ITU-T Recommendation G.Sup43 (02/11) clause 6.2.

12. The packet fabric of claim 10, wherein the OTN container comprises an Optical channel Data Unit flex (ODUflex).

13. The packet fabric of claim 10, wherein the OTN container comprises one of a High Order Optical channel Data Unit j (HO ODUj) and a Low Order Optical channel Data Unit i (LO ODUi).

14. The packet fabric of claim 10, wherein the condition is a fault and the maintenance signals in the OTN overhead comprise one or more of a Lock (LCK) and a Backward Defect Indication (BDI).

15. The packet fabric of claim 10, wherein the maintenance signals comprise one or more of an Optical channel Data Unit Open Connection Indication (ODU-OCI) and Optical channel Data Unit Alarm Indication Signal (ODU-AIS).

16. The packet fabric of claim 10, wherein the maintenance signals comprise a Tandem Connection Monitor (TCM) provisioned for the Ethernet service between a head end node and a tail end node.

17. The packet fabric of claim 10, wherein the Ethernet service is part of a Link Aggregation Group (LAG).

18. The packet fabric of claim 10, wherein the maintenance signals signal one or of a local fault at the packet fabric and a remote fault at another packet fabric.

19. A network adapted for Ethernet link state signaling with an Ethernet service transported over Optical Transport Network (OTN) utilizing Generic Framing Procedure Framed (GFP-F) mapping, the network comprising:
    a head end node;
    a tail end node; and
    an OTN cloud communicatively coupling the head end node and the tail end node;
    wherein the head end node is adapted to map packets to an OTN container over GFP-F and the tail end node is adapted to demap the packets from the OTN container, and
    wherein the head end node and the tail end node are each adapted to cause insertion of maintenance signals in OTN overhead based on detection of a condition instead of using GFP-F Client Management Frames (CMF), wherein either the head end node or the tail end node detect the condition associated with the Ethernet service based on detection of the maintenance signals in the OTN overhead and perform associated actions on the Ethernet service.

20. The network of claim 19, wherein the GFP-F mapping is compliant to ITU-T Recommendation G.Sup43 (02/11) clause 6.2.

* * * * *